A. MOORHOUSE.
DUST CAP FOR AUTOMOBILE STARTING CRANK SHAFTS.
APPLICATION FILED AUG. 9, 1912.
1,068,804.  Patented July 29, 1913.
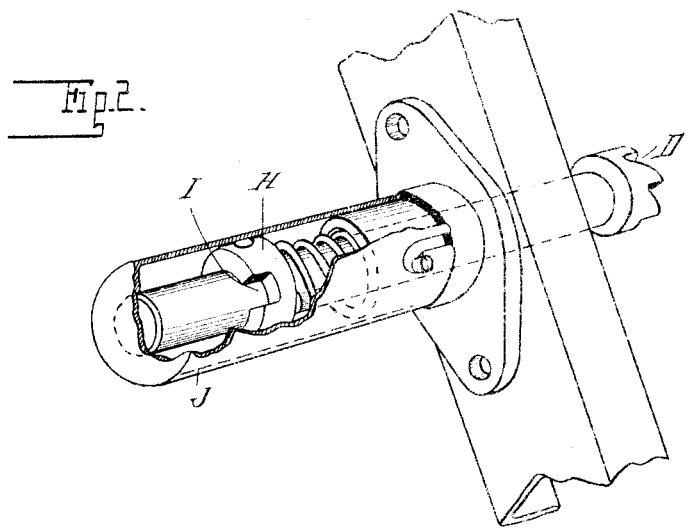
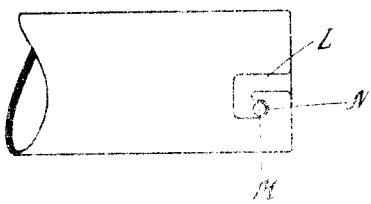
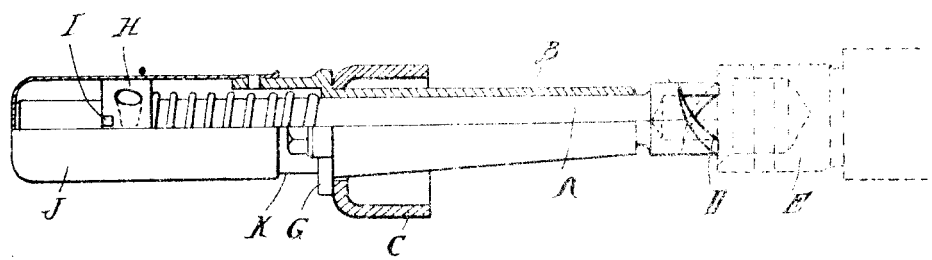
WITNESSES:
INVENTOR,
Alfred Moorhouse
ATTORNEYS,

UNITED STATES PATENT OFFICE.

ALFRED MOORHOUSE, OF DETROIT, MICHIGAN, ASSIGNOR TO HUDSON MOTOR CAR COMPANY, OF DETROIT, MICHIGAN, A CORPORATION OF MICHIGAN.

DUST-CAP FOR AUTOMOBILE STARTING-CRANK SHAFTS.

1,068,804.

Specification of Letters Patent.

Patented July 29, 1913.

Application filed August 3, 1912. Serial No. 713,080.

*To all whom it may concern:*

Be it known that I, ALFRED MOORHOUSE, a citizen of the United States of America, residing at Detroit, in the county of Wayne and State of Michigan, have invented certain new and useful Improvements in Dust-Caps for Automobile Starting-Crank Shafts, of which the following is a specification, reference being had therein to the accompanying drawings.

The invention relates to automobile starting crank constructions, and it is the object of the invention to provide a dust cap or inclosing casing for the mechanism when the crank is removed.

It is a further object to utilize the spring which normally retracts the starting crank from its engagement with the engine crank shaft for the further function of locking the dust cap in position, as hereinafter set forth.

In the drawings: Figure 1 is a longitudinal section through the construction; Fig. 2 is a sectional perspective view thereof; Fig. 3 is a side elevation showing the locking means.

A is the starting crank shaft, which is journaled in a suitable bearing B attached to the cross bar C or other support on the vehicle frame. The inner end of this crank shaft is suitably fashioned at D for engagement with the engine crank shaft, the position of the latter being indicated by dotted lines at E.

F is a spring for normally holding the shaft A out of engagement with the crank shaft E, one end of said spring abutting against the shoulder G on the bearing B, while the opposite end engages a collar H on the shaft A. This collar is notched at I for interlocking with the starting crank (not shown).

When the crank is not in use it is removed from the crank shaft A, and to protect the parts from dust they are inclosed by a cap or tubular casing J and this cap fits over a tubular extension K of the bearing B, to which it is preferably secured by a bayonet lock, comprising the slot L in the cap and the pin M on the member K. The cap J is so proportioned that during the engagement of the pin M with the bayonet slot L the end of the cap will press against the end of the starting crank shaft A, and move the latter forward against the tension of the spring F bearing upon the collar H. Thus the tension of this spring will retain the pin M in engagement with the locking notch N at the inner end of the slot, which will prevent accidental disengagement with the cap.

With the construction as described the cap J will completely house the mechanism and will be held from accidental disengagement during the use of the car. At the same time this cap may be instantaneously removed when it is necessary to use the starting crank for starting the engine.

What I claim as my invention is:

1. The combination with a revoluble and longitudinally adjustable shaft, of a bearing in which said shaft is mounted and from which a portion of the shaft projects, resilient means for yieldably resisting forward movement of said shaft in its bearing, and a cap for housing the projecting portion of said shaft, having a detachable locking engagement with said bearing and held in such engagement by said resilient member.

2. The combination with a bearing of a shaft journaled and longitudinally adjustable in said bearing, having an outwardly projecting portion, a cap for housing the projecting portion of said shaft detachably engaging said bearing, and a spring for yieldably projecting said shaft, adapted to be placed in tension by the engagement of said cap.

3. The combination with a bearing of a shaft journaled and longitudinally adjustable in said bearing, having an outwardly projecting portion, a collar on said projecting portion of the shaft, a spring sleeved on said shaft between said collar and said bearing, a tubular cap for housing the projecting end of said shaft, the collar and the spring sleeved thereon, the end of said cap bearing against said shaft and telescopically engaging a portion of said bearing, and locking means for said cap with said bearing, engageable by an inward movement of said shaft against the tension of said spring.

4. The combination with a starting crank shaft, of a bearing in which said shaft is rotatably and longitudinally adjustable, a spring sleeved upon a projecting portion of said shaft, a collar on said shaft against which said spring abuts, a tubular cap for inclosing the projecting portion of said shaft, the spring and the collar, and telescopically engaging a portion of said bearing, and a bayonet lock between said cap and bearing, held in engagement by the tension of said spring.

5. The combination with a starting crank shaft, of a bearing in which said shaft is rotatively and longitudinally adjustable, a spring sleeved upon a projecting portion of said shaft, a collar on said shaft forming an abutment for said spring, a tubular projection from said bearing of corresponding diameter to said collar, a tubular cap fitting over said collar and tubular projection and bearing against the end of said shaft, and a bayonet lock for said cap upon said bearing, engageable by the forward movement of said shaft against the tension of said spring.

6. The combination with a starting crank shaft provided with means for engagement with a detachable crank, of a bearing in which said shaft is rotatively and longitudinally adjustable and from which a portion of said shaft projects, a cap for housing the projecting portion of said shaft having a detachable locking engagement with said bearing, and a spring sleeved upon said shaft within said cap, forming a yieldable retracting means for said shaft and also yieldably holding said cap in its locking engagement.

7. The combination with a starting crank shaft, of a bearing in which said shaft is rotatively and longitudinally adjustable, a notched collar on the projecting portion of said shaft for engagement with a detachable crank, a spring sleeved on said shaft between said collar and said bearing, a tubular projection from said bearing of corresponding diameter to said collar, a tubular cap telescopically engaging said tubular projection and inclosing the projecting portion of said shaft, the collar and spring, and a bayonet lock for said cap upon said tubular projection, engageable by an inward movement of the shaft against the tension of said spring, whereby the latter prevents accidental disengagement.

In testimony whereof I affix my signature in presence of two witnesses.

ALFRED MOORHOUSE.

Witnesses:
H. M. Dennis,
Wm. Daniels.